Patented Jan. 30, 1940

2,188,700

UNITED STATES PATENT OFFICE 2,188,700

PROCESS FOR FILLING CONTAINERS

James W. Bassett, Staten Island, N. Y., assignor to The Procter & Gamble Company, Cincinnati, Ohio, a corporation of Ohio No Drawing. Application May 23, 1938,
Serial No. 209,631

8 Claims. (Cl. 226—82)

This invention relates to a process for filling containers with plastic shortening, or other material containing vesiculated gas, with exclusion of air or other gas above the surface of the material in the can.

Its object is to provide a method of packing shortening or other material susceptible to spoilage from oxidation, in such a way as to substantially prevent such spoilage.

While the description of this invention is devoted mainly to the packing of plastic shortening fats, it is not limited thereto and may be applied to other plastic materials containing vesiculated gas.

Shortenings have commonly been manufactured and sold in at least three different forms, the principal ones being: first, a natural fat such as lard; second, a so-called standard shortening consisting of a liquid oil such as cottonseed oil mixed with a suitable proportion of a hard fat such as oleo stearin or a highly hydrogenated oil; and, thirdly, a so-called hydrogenated shortening consisting of a liquid oil such as cottonseed hardened by hydrogenation to such a degree as will give the desired consistency for use as shortening. It has been customary to incorporate with the shortening, for the purposes of improving the color, appearance, and texture, a quantity of air or other gas which is beaten into the fat much as in the preparation of whipped cream, while the fat is in a semi-solid condition. The amount of air thus incorporated in form of minute bubbles has generally amounted to about eight to fifteen per cent of the product by volume, and this air or gas has been called "vesiculated" air or gas. In addition to this vesiculated air or gas, the fat after exposure to air or gas always absorbs and retains about six to eight per cent by volume of air or gas in the form of a true solution after equilibrium is reached at atmospheric pressure.

It has long been customary to pack shortening fats in tin cans or other containers, but if the cans were not strictly air-tight, the material was found to become rancid in the course of time due to oxidation, caused partly by the air contained in the can above the fat after filling, partly by the air incorporated in the body of the fat itself, and partly by air seeping into the can from the atmosphere through points of leakage. Various methods have been tried to overcome these conditions and to provide a means for keeping the fat in good condition for a long period of time. First, air-tight cans were adopted which were sealed after being filled with the shortening containing the usual vesiculated air and dissolved air, and thus seepage of additional fresh air from the outside atmosphere into the can was prevented. This greatly prolonged the period during which the fat remained free from rancidity. Secondly, an inert gas such as nitrogen was incorporated with the fat instead of air as formerly used, partly in solution and partly in the vesiculated form. This obviously replaced an equivalent quantity of air otherwise present in the shortening, but still left the space in the can above the surface of the shortening filled with atmospheric air. The third step, used in addition to the first two, was to pack the material in an atmosphere of inert gas such as nitrogen instead of air and then seal the can while in an atmosphere of nitrogen. By the combination of these three steps it has been possible to pack shortening so that it will have practically perfect keeping quality over an indefinite period, for the reason that all contact with oxygen or air in any form is entirely avoided.

I have discovered that practically all the advantages of the last mentioned method of packing, having an atmosphere of inert gas above the surface of the fat containing vesiculated inert gas, can be secured without the trouble and expense of packing and sealing in an inert atmosphere by first incorporating the desired amount of an inert gas in the fat, filling same in a container in the presence of ordinary atmospheric air, and then immediately applying a suitable vacuum whereby the vesiculated gas expands and the body of fat itself is caused to swell in the package so as to fill the space up to the lid, thereby displacing the air that would otherwise remain in the can. My product, thus prepared, has substantially all the advantages of one filled in an atmosphere of inert gas in that the fat is in an air-tight package, not in contact with air or oxygen, and its keeping quality is extended almost indefinitely.

It is understood that in applying this invention it is necessary to use a can or other container made of a material impervious to air or gas, such as an ordinary tin can for example.

In carrying out my invention as applied to packing ordinary shortening containing about twelve per cent of vesiculated gas in tin cans, for example, I first prepare the shortening as usual, including steam deodorizing under vacuum, and after cooling by known means to a semi-solid state I incorporate in same the desired amount of gas, without contact with atmospheric air, say about six per cent in true solution and twelve per cent in vesiculated form, choosing for this purpose preferably an inert gas such as nitrogen. The shortening thus prepared is then run into a can while exposed to the air, filling it to the desired level, leaving usually an outage of about five per cent to ten per cent of the volume of the can, which is a desirable average outage for safe filling of cans under practical conditions. It is not practical to fill cans entirely full before attaching an air-tight lid; a small outage must always be left because of the unavoidable irregularities in weights and volume of material put into the cans. I then place the lid on the can and seal the edges of same to the can in an air-tight relation by soldering or crimping in known manner, said lid having a suitable perforation, and being removable or detachable from the can for the purpose of removing the contents. This perforation need be no larger than a pin hole. Next, I place the can in a suitable chamber from which the air can be evacuated to any desired degree, thus exhausting through the aforementioned perforation the air contained in the can above the surface of the shortening. Under these conditions the bubbles of vesiculated gas contained in the shortening expand due to the reduced pressure, thus causing the entire body of shortening to swell and to fill the space in the can up to the lid. By proper adjustment of the vacuum, it is possible to thus expel substantially all of the air or other gas from the can without drawing the shortening out of the can through the perforation in the lid. Then while the vacuum is still maintained, the perforation in the lid is sealed by solder or otherwise, thus providing an air-tight package of the shortening hermetically sealed and substantially free from air.

A covering of parchment paper or other suitable material may, if desired, be placed over the surface of the shortening under the lid which will prevent the shortening from sticking to the lid and make it easier for the user to remove the lid.

The can may also be filled from the bottom instead of what is normally the top by first attaching the true lid (which is eventually to be removed or detached by the user) to the body of the can before the bottom is attached, filling the can in an upside down position with the lid thus serving as a bottom of the can during the filling operation, and then attaching to the can the permanent bottom having a small perforation and exhausting the air as previously described when using a perforated lid. In this way the bottom of the can serves as a cover or temporary lid until the air is exhausted and the true lid need have no perforation. After reversal to the usual position for shipment and use, the perforation with its closure will be on the bottom of the can so that the can itself after filling, and also its contents when opened by means of the true lid, will present a more pleasing appearance to the user.

In packing shortening, for example, containing about twelve per cent vesiculated gas in a can filled with an outage of about five per cent of the volume of the can, I find that a vacuum of about seven inches of mercury is sufficient to cause the shortening to swell so as to entirely fill the can without causing the shortening to exude through the perforation in the lid.

When the lid is removed by the user, thus breaking the partial vacuum in the can, air enters, thus restoring atmospheric pressure and the mass of shortening with its vesicular gas returns to its original volume.

The aforementioned perforation, usually in the lid or the bottom of the can, may of course be located elsewhere if desired, as for example on the side of the can above the surface of the shortening or other contents. The essential point is to have it so placed as to permit most or all of the air to be withdrawn without withdrawing the shortening.

Comparative tests have shown that shortening capable of absorbing oxygen and become rancid under ordinary conditions of packing is preserved when packed in this manner so that it has very nearly the same advantages as the previously described completely inert-gas-packed material with a considerably lower cost.

Having thus described my invention, what I claim is:

1. A process for packing and sealing plastic materials containing vesiculated gas in containers which are impervious to air, leaving substantially no air in said container other than the vesiculated gas, which comprises placing the said plastic material in a container at atmospheric pressure, leaving a small outage, applying to said container a lid in air-tight relationship to same except for a small perforation in said lid, exhausting the air between the surface of the plastic material and the lid through the said perforation, whereby the plastic material is caused to expand and fill the space under the lid due to expansion of the vesiculated gas, and sealing the perforation in the lid while the air is thus exhausted from said container and said container remains substantially filled with said plastic material under subatmospheric pressure.

2. A process for packing and sealing shortening containing vesiculated inert gas in containers which are impervious to air, leaving substantially no air in said container, which comprises placing the said shortening in a container at atmospheric pressure, leaving a small outage, applying to said container a lid in air-tight relationship to same except for a small perforation in said lid, exhausting the air between the surface of the shortening and the lid through the said perforation, whereby the shortening is caused to expand and fill the space under the lid due to expansion of the vesiculated gas, and sealing the perforation in the lid while the air is thus exhausted from said container and said container remains substantially filled with said shortening under subatmospheric pressure.

3. A process for packing and sealing shortening containing vesiculated nitrogen in containers which are impervious to air, leaving substantially no air in said container, which comprises placing the said shortening in a container at atmospheric pressure, leaving a small outage, applying to said container a lid in air-tight relationship to same except for a small perforation in said lid, exhausting the air between the surface of the shortening and the lid through the said perforation, whereby the shortening is caused to expand and fill the space under the lid due to expansion of the vesiculated nitrogen, and sealing the perforation in the lid while the air is thus exhausted from said container and said container remains substantially filled with said shortening under subatmospheric pressure.

4. A process for packing and sealing shortening containing vesiculated inert gas in containers which are impervious to air, leaving substantially no air in said container, which comprises placing the said shortening in a container at atmospheric pressure, leaving a small outage, placing a covering of parchment paper on the surface of said shortening, applying to said container a lid in air-tight relationship to same except for a small perforation in said lid, exhausting the air between the surface of the shortening and the lid through the said perforation, whereby the shortening is caused to expand and fill the space under the lid due to expansion of the vesiculated gas, and sealing the perforation in the lid while the air is thus exhausted from said container and said container remains substantially filled with said shortening under subatmospheric pressure.

5. A process for packing and sealing shortening containing vesiculated inert gas in containers which are impervious to air, leaving substantially no air in said container, which comprises placing the shortening under atmospheric pressure in a container while in upside down position, leaving a small outage, said container having a detachable unperforated lid attached to the body of said container in air-tight relationship to same and serving as the bottom of the container during said filling operation, applying the permanent bottom of said container in air-tight relationship to same except for a small perforation in said bottom, exhausting the air above the surface of the shortening through the said perforation, whereby the shortening is caused to expand and fill the space under the bottom while in the upside down position due to expansion of the vesiculated gas, and sealing the said perforation while the air is thus exhausted from said container and said container remains substantially filled with said shortening under subatmospheric pressure.

6. A process for packing and sealing shortenings and similar plastic products vesiculated with gas which consists in incompletely filling an air-tight container with the plastic product, then exhausting the gas in the space left by incomplete filling by drawing a vacuum through a suitable opening left in the container in the zone of incomplete filling, thus causing the material to swell and occupy the said space through expansion of the vesiculated gas, and finally sealing said opening while said container remains substantially filled with said material under subatmospheric pressure.

7. A process for packing and sealing shortenings and similar plastic products vesiculated with gas which consists in incompletely filling an air-tight container with the plastic product, then exhausting the gas in the space left by incomplete filling by drawing a vacuum through a suitable opening left in the container in the zone of incomplete filling, thus causing the material to occupy the said space through expansion of the vesiculated gas, and finally sealing said opening while said container remains substantially filled with said material under subatmospheric pressure, the surface of the plastic product exposed to said space being covered with a relatively impervious sheet of material during said exhausting step.

8. A process for packing and sealing shortenings and similar plastic products vesiculated with gas which consists in incompletely filling an air-tight container with the plastic product, then exhausting the gas in the space left by incomplete filling by drawing a vacuum through a suitable opening left in the container in the zone of incomplete filling, thus causing the material to occupy the said space through expansion of the vesiculated gas, and finally sealing said opening while said container remains substantially filled with said material under subatmospheric pressure, the filling of the container being done at atmospheric pressure in the presence of air, and the gas of vesiculation being of inert character.

JAMES W. BASSETT.